US011940214B1

(12) United States Patent
Morimoto et al.

(10) Patent No.: US 11,940,214 B1
(45) Date of Patent: Mar. 26, 2024

(54) FREEZE-DRIVED PRODUCT

(71) Applicant: MII LTD., Osaka (JP)

(72) Inventors: Shuji Morimoto, Osaka (JP); Makoto Takehara, Tokyo (JP); Masato Kobayashi, Osaka (JP)

(73) Assignee: MII, LTD., Osaka (JP)

( * ) Notice: Subject to any disclaimer, the term of this patent is extended or adjusted under 35 U.S.C. 154(b) by 0 days.

(21) Appl. No.: 18/284,291

(22) PCT Filed: Aug. 2, 2022

(86) PCT No.: PCT/JP2022/029630
§ 371 (c)(1),
(2) Date: Sep. 27, 2023

(87) PCT Pub. No.: WO2023/013630
PCT Pub. Date: Feb. 9, 2023

(30) Foreign Application Priority Data

Aug. 3, 2021 (JP) ................................ 2021-127617

(51) Int. Cl.
*F26B 5/06* (2006.01)
*F26B 17/20* (2006.01)

(52) U.S. Cl.
CPC .............. *F26B 5/065* (2013.01); *F26B 17/20* (2013.01)

(58) Field of Classification Search
CPC ................................ F26B 5/065; F26B 17/20
See application file for complete search history.

(56) References Cited

U.S. PATENT DOCUMENTS 236,677 A * 1/1881 Halsey ...................... F26B 5/06 366/291
430,652 A * 6/1890 Jarrett ..................... F26B 17/20 34/182

(Continued)

FOREIGN PATENT DOCUMENTS

CA 2834324 A1 * 11/2012 .............. C10L 5/366
CA 2949789 A1 * 12/2016 ............. B65G 33/18

(Continued)

OTHER PUBLICATIONS

International Search Report for PCT/JP2022/029630 dated Oct. 4, 2022.

(Continued)

*Primary Examiner* — Edelmira Bosques
*Assistant Examiner* — Bao D Nguyen
(74) *Attorney, Agent, or Firm* — Yokoi & Co., U.S.A.; Toshiyuki Yokoi

(57) ABSTRACT

A freeze-dried product continuously manufactured by being dried while smoothly moving in a state of receiving a mechanical force in a freeze-drying apparatus 1. The freeze-drying apparatus 1 includes a freezing unit 2 for producing a frozen substance by spraying a raw material solution; and a drying unit 3 for drying the frozen substance. The drying unit 3 has a tubular shape and includes a tubular member 31 kept in a vacuum state, and a spiral wall or groove portion is formed on an inner wall of the tubular member 31 continuously in a longitudinal direction of the tubular member 31. A heat is transferred to the inner wall of the tubular member 31 and the spiral wall or groove portion. The tubular member 31 is configured to be rotated to transfer the freeze-dried product in the longitudinal direction of the tubular member 31 and sublimate or dry the freeze-dried product. A flow-start angle is less than 44 degrees or a repose angle is less than 55 degrees and larger than the flow-start (Continued)

angle, and a residual amount is 3 g or less with respect to 10 g of the raw material solution fed into freeze-drying apparatus when a length of the tubular member 31 is 30 cm in the longitudinal direction.

6 Claims, 10 Drawing Sheets

(56) References Cited

U.S. PATENT DOCUMENTS

| | | | | | |
|---|---|---|---|---|---|
| 474,568 | A * | 5/1892 | Weller | F26B 17/20 | 34/182 |
| 548,573 | A * | 10/1895 | Moller et al. | F26B 5/06 | 34/76 |
| 676,165 | A * | 6/1901 | Wacker | F26B 17/20 | 34/182 |
| 986,107 | A * | 3/1911 | Wertenbruch | F26B 17/20 | 34/166 |
| 1,051,359 | A * | 1/1913 | Wille | F26B 17/20 | 34/182 |
| 1,165,774 | A * | 12/1915 | Grambauer | F26B 17/20 | 34/182 |
| 1,172,479 | A * | 2/1916 | Motter | F27B 17/00 | 432/66 |
| 1,179,192 | A * | 4/1916 | Kleinschmidt | F27B 17/00 | 34/79 |
| 1,303,982 | A * | 5/1919 | Stevens | F26B 5/06 | 34/166 |
| 1,735,393 | A * | 11/1929 | Hiller | F26B 17/20 | 366/326.1 |
| 1,735,396 | A * | 11/1929 | Hiller | F26B 17/20 | 34/387 |
| 2,038,904 | A * | 4/1936 | Rand | F26B 17/20 | 366/183.2 |
| 2,067,506 | A * | 1/1937 | Silva | F26B 17/20 | 34/166 |
| 2,388,917 | A * | 11/1945 | Hormel | F26B 5/06 | 426/418 |
| 2,411,152 | A * | 11/1946 | Folsom | F26B 5/06 | 264/5 |
| 2,515,098 | A * | 8/1950 | Smith, Jr. | C01B 13/145 | 62/271 |
| 2,552,360 | A * | 5/1951 | Zichis | F26B 5/06 | 241/97 |
| 2,616,604 | A * | 11/1952 | Folsom | B01D 7/00 | 53/484 |
| 2,636,284 | A * | 4/1953 | Napier | A23L 3/18 | 241/3 |
| 2,743,168 | A * | 4/1956 | Krohn | B01D 7/00 | 423/19 |
| 2,751,687 | A * | 6/1956 | Colton | B01J 2/00 | 264/28 |
| 2,803,888 | A * | 8/1957 | Cerletti | F26B 5/06 | 34/305 |
| 3,088,222 | A * | 5/1963 | Mace | F26B 5/06 | 34/92 |
| 3,262,212 | A * | 7/1966 | De Buhr | F26B 5/06 | 34/292 |
| 3,264,747 | A * | 8/1966 | Fuentevilla | F26B 3/34 | 219/679 |
| 3,266,169 | A * | 8/1966 | Smith, Jr. | F26B 5/06 | 62/347 |
| 3,270,432 | A * | 9/1966 | Barbareschi | B01D 7/00 | 34/305 |
| 3,310,881 | A * | 3/1967 | Fritzberg | F26B 5/041 | 426/465 |
| 3,316,652 | A * | 5/1967 | Van Gelder | F26B 5/06 | 34/292 |
| 3,324,565 | A * | 6/1967 | Smith, Jr. | F26B 5/06 | 34/92 |
| 3,362,835 | A * | 1/1968 | Thuse | A23F 5/32 | 159/4.06 |
| 3,376,652 | A * | 4/1968 | Hernandez, Jr. | F26B 5/06 | 34/292 |
| 3,445,247 | A * | 5/1969 | Baerwald | F26B 5/06 | 426/640 |
| 3,469,327 | A * | 9/1969 | Camillo | F26B 5/042 | 34/526 |
| 3,531,872 | A * | 10/1970 | Watson | F26B 3/00 | 210/781 |
| 3,601,901 | A * | 8/1971 | Rader | F26B 5/065 | 34/92 |
| 3,605,273 | A * | 9/1971 | Andersen | F26B 17/20 | 34/92 |
| 3,612,411 | A * | 10/1971 | Oetjen | F26B 5/06 | 241/24.1 |
| 3,616,542 | A * | 11/1971 | Rader | F26B 5/065 | 34/92 |
| 3,952,541 | A * | 4/1976 | Rigoli | A01N 1/0252 | 34/284 |
| 4,037,331 | A * | 7/1977 | Brilloit | F26B 5/06 | 34/92 |
| 4,746,968 | A * | 5/1988 | Wear | A23L 3/54 | 34/259 |
| 5,964,043 | A * | 10/1999 | Oughton | F26B 5/06 | 34/92 |
| 7,140,122 | B1 * | 11/2006 | Adams | F26B 5/041 | 34/361 |
| 8,978,268 | B2 * | 3/2015 | Itou | F26B 5/065 | 34/291 |
| 10,627,162 | B2 * | 4/2020 | Delaveau | F26B 11/0445 | |
| 11,112,176 | B2 * | 9/2021 | Nishihashi | F26B 5/065 | |
| 2007/0022626 | A1 * | 2/2007 | Gomi | F26B 5/04 | 34/410 |
| 2008/0142166 | A1 * | 6/2008 | Carson | B01D 1/18 | 159/7 |
| 2011/0192047 | A1 * | 8/2011 | Itou | A23L 3/44 | 34/92 |
| 2014/0026434 | A1 * | 1/2014 | Sawada | F26B 5/06 | 34/524 |
| 2014/0230266 | A1 | 8/2014 | Luy et al. | | |
| 2016/0153713 | A1 * | 6/2016 | Tsubata | F26B 5/06 | 34/79 |
| 2017/0013868 | A1 * | 1/2017 | Yuda | A23L 33/21 | |
| 2017/0219283 | A1 * | 8/2017 | Gebhard | A61K 9/19 | |
| 2021/0080179 | A1 * | 3/2021 | Nishihashi | F26B 17/16 | |
| 2021/0356208 | A1 | 11/2021 | Morimoto et al. | | |

FOREIGN PATENT DOCUMENTS

| | | | | |
|---|---|---|---|---|
| EP | 2578974 | A1 * | 4/2013 | F26B 5/06 |
| FR | 3052544 | A1 * | 12/2017 | F26B 17/20 |
| JP | 2002-29909 | A | 1/2002 | |
| JP | 2004232883 | A * | 8/2004 | |
| JP | 2006177640 | A * | 7/2006 | |
| JP | 2014-530061 | A | 11/2014 | |
| JP | 6777350 | B | 10/2020 | |
| WO | WO-9629556 | A1 * | 9/1996 | F26B 5/06 |
| WO | 2010/005021 | A | 1/2010 | |
| WO | WO-2010005021 | A1 * | 1/2010 | A23L 3/44 |
| WO | WO-2013036107 | A2 * | 3/2013 | F26B 5/06 |
| WO | 2013/050162 | A | 4/2013 | |
| WO | 2015/141787 | A | 9/2015 | |
| WO | WO-2018204484 | A1 * | 11/2018 | A23L 2/14 |
| WO | 2019/235036 | A | 12/2019 | |
| WO | WO-2019235036 | A1 * | 12/2019 | A23L 3/001 |

OTHER PUBLICATIONS

PCT written opinion dated Oct. 4, 2022.
Complete translation of PCT written opinion dated Oct. 4, 2022.

* cited by examiner

Fig. 8

Raw data of repose angle and flow-start angle

| sample No. | sample name | No. | repose angle 1 (°) | repose angle 2 (°) | repose angle 3 (°) | repose angle 4 (°) | average of repose angle at four positions (°) | average of repose angle (°) | standard deviate of repose angle | flow-start angle (°) | average of flow-start angle (°) | standard deviate of flow-start angle |
|---|---|---|---|---|---|---|---|---|---|---|---|---|
| 1 | SFD 10%-Mannitol/10%-sucrose | 1 | 36 | 35.7 | 41.3 | 33.1 | 36.5 | 40.5 | 2.8 | 39 | 36.5 | 6.1 |
| | | 2 | 47.3 | 40.2 | 43.1 | 40.6 | 42.8 | | | 31 | | |
| | | 3 | 44 | 42.4 | 42.5 | 40 | 42.2 | | | 44 | | |
| | | 4 | 42.6 | 36.2 | 45.7 | 37.6 | 40.5 | | | 32 | | |
| 2 | SFD 8%-D-Mannitol/2%-sucrose | 1 | 43.3 | 32.6 | 38.1 | 31.3 | 36.3 | 38.7 | 2.4 | 23 | 27.3 | 3.8 |
| | | 2 | 40.8 | 39.6 | 38.3 | 36.5 | 38.8 | | | 29 | | |
| | | 3 | 43.3 | 35 | 45.6 | 40.3 | 41.1 | | | 30 | | |
| 3 | SFD 5%-D-Mannitol/5%-trehalose | 1 | 41.6 | 42 | 44.3 | 40.9 | 42.2 | 40.2 | 3.8 | 43 | 38.0 | 4.4 |
| | | 2 | 47 | 38 | 41.2 | 43.9 | 42.5 | | | 36 | | |
| | | 3 | 32.7 | 40.8 | 31.2 | 38.6 | 35.8 | | | 35 | | |
| 4 | SFD 5%-erythritol/5%-sucrose | 1 | 36.2 | 36.2 | 43.1 | 33.4 | 37.2 | 35.7 | 2.3 | 34 | 34.3 | 0.6 |
| | | 2 | 35 | 42.1 | 36.2 | 33.5 | 36.7 | | | 35 | | |
| | | 3 | 33.6 | 33.5 | 32.1 | 33 | 33.1 | | | 34 | | |
| 5 | SFD 5%-D-Mannitol/5%-sucrose | 1 | 40 | 36.2 | 41.2 | 44 | 40.4 | 37.2 | 2.8 | 36 | 37.0 | 5.6 |
| | | 2 | 37.5 | 34.4 | 34.7 | 37 | 35.9 | | | 33 | | |
| | | 3 | 36.6 | 32.1 | 33 | 39.4 | 35.3 | | | 40 | | |
| | | | | | | | | | | 39 | | |
| 6 | SFD 10%-trehalose | 1 | 48.9 | 48.6 | 48.1 | 50.7 | 49.1 | 49.4 | 0.7 | 27 | 31.3 | 4.5 |
| | | 2 | 45.4 | 48.3 | 51.4 | 50.2 | 48.8 | | | 31 | | |
| | | 3 | 49.6 | 53.1 | 50 | 47.9 | 50.2 | | | 36 | | |
| 7 | SFD 10%-sucrose | 1 | 55.1 | 52.3 | 52.2 | 54.7 | 53.6 | 49.9 | 4.6 | 45 | 41.0 | 3.6 |
| | | 2 | 47.5 | 48.7 | 53.5 | 55.6 | 51.3 | | | 38 | | |
| | | 3 | 45.6 | 46.8 | 43.2 | 43.6 | 44.8 | | | 40 | | |
| 8 | SFD 10%-D-Mannitol | 1 | 44.8 | 46.4 | 47.6 | 45.9 | 46.2 | 47.7 | 5.9 | 32 | 40.3 | 6.9 |
| | | 2 | 52.6 | 45.4 | 48.8 | 46.2 | 48.3 | | | 37 | | |
| | | 3 | 55 | 54.5 | 56.5 | 55.3 | 55.3 | | | 46 | | |
| | | 4 | 40 | 43.4 | 48.5 | 32.1 | 41.0 | | | 46 | | |
| reference example 1 | Tablettose (MEGGLE) | 1 | 30.8 | 31.5 | 29.8 | 30 | 30.2 | 31.2 | 1.1 | 29.1 | 29.6 | 0.6 |
| | | 2 | 33.3 | 32.9 | 32.9 | 30.7 | 32.5 | | | 30.3 | | |
| | | 3 | 32.8 | 31.9 | 28.5 | 31.1 | 31.1 | | | 29.5 | | |
| reference example 2 | potato starch (Sun Smile) | 1 | 47.4 | 48.1 | 47.4 | 47.4 | 47.6 | 48.0 | 0.4 | 30.4 | 31.1 | 0.6 |
| | | 2 | 47.7 | 48.3 | 49.3 | 48 | 48.3 | | | 31.3 | | |
| | | 3 | 49.8 | 48.2 | 47.9 | 46.8 | 48.2 | | | 31.5 | | |

Fig. 9

Raw data of repose angle and flow-start angle

| sample No. | sample name | No. | repose angle 1 (°) | repose angle 2 (°) | repose angle 3 (°) | repose angle 4 (°) | average of repose angle at four positions (°) | average of repose angle (°) | standard deviate of repose angle | flow-start angle (°) | average of flow-start angle (°) | standard deviate of flow-start angle |
|---|---|---|---|---|---|---|---|---|---|---|---|---|
| 9 | SFD 10%-erythritol | 1 | 37 | 28.6 | 34.1 | 30.6 | 32.6 | 31.9 | 0.8 | 42 | 46.7 | 5.7 |
| | | 2 | 25.7 | 24.3 | 39 | 35 | 31.0 | | | 45 | | |
| | | 3 | 31.5 | 36 | 32.4 | 28.2 | 32.0 | | | 53 | | |
| 10 | FD 5%-D-Mannitol/5%-trehalose | 1 | 46.5 | 45.6 | 45.5 | 46.2 | 46.0 | 46.5 | 3.1 | 56 | 55 | 5.6 |
| | | 2 | 50.8 | 48.9 | 52.6 | 45.4 | 49.4 | | | 60 | | |
| | | 3 | 45 | 42.3 | 42.4 | 40.1 | 42.5 | | | 49 | | |
| | | 4 | 44.8 | 45.9 | 45.2 | 57.1 | 48.3 | | | | | |
| 11 | FD 5%-D-Mannitol/5%-sucrose | 1 | 35.5 | 45.1 | 38.1 | 37.6 | 39.1 | 36.9 | 3.9 | 38 | 54.6 | 13.1 |
| | | 2 | 42 | 38.4 | 37.6 | 36 | 38.5 | | | 74 | | |
| | | 3 | 28.3 | 29.3 | 29.6 | 32.6 | 30.0 | | | 51 | | |
| | | 4 | 40 | 31.4 | 40.2 | 39.8 | 37.9 | | | 52 | | |
| | | 5 | 38 | 37.6 | 39.2 | 41.7 | 39.1 | | | 58 | | |
| 12 | FD 10%-erythritol | 1 | 30.6 | 24.9 | 32.5 | 23.0 | 27.8 | 30.5 | 3.1 | 41 | 46.7 | 4.9 |
| | | 2 | 37.4 | 32 | 36.4 | 29.6 | 33.9 | | | 49 | | |
| | | 3 | 28.8 | 28.3 | 31 | 31.2 | 29.8 | | | 50 | | |
| 13 | FD 5%-erythritol/5%-sucrose | 1 | 36.2 | 41.7 | 36.1 | 34.8 | 37.2 | 35.7 | 1.3 | 57 | 54 | 4.4 |
| | | 2 | 34.5 | 33.3 | 35.4 | 35.7 | 34.7 | | | 56 | | |
| | | 3 | 34.8 | 34.6 | 36.5 | 35.1 | 35.3 | | | 49 | | |
| 14 | FD 10%-trehalose | 1 | 68 | 64.3 | 61.5 | 66.4 | 65.1 | 59.4 | 5.5 | 52 | 58 | 5.3 |
| | | 2 | 57.3 | 64.6 | 56.3 | 58.0 | 59.1 | | | 60 | | |
| | | 3 | 56.5 | 54.8 | 49.7 | 55.6 | 54.2 | | | 62 | | |
| 15 | FD10%-D-Mannitol | 1 | 37 | 36.4 | 37.0 | 35.2 | 36.4 | 39.7 | 3.1 | 47.5 | 52.3 | 7.5 |
| | | 2 | 40.3 | 37.4 | 38.4 | 44.5 | 40.2 | | | 61 | | |
| | | 3 | 46.5 | 40.1 | 41.4 | 42.1 | 42.5 | | | 48.5 | | |
| 16 | FD 10%-sucrose | 1 | 53.1 | 51.6 | 54.7 | 51.2 | 52.7 | 50.6 | 2.0 | 60 | 63.7 | 3.5 |
| | | 2 | 48.8 | 48.2 | 50.4 | 47.2 | 48.7 | | | 64 | | |
| | | 3 | 50.3 | 43.9 | 47.7 | 60.0 | 50.5 | | | 67 | | |
| 17 | FD 8%-D-Mannitol/2%-sucrose | 1 | 43.5 | 34 | 40.3 | 37.5 | 38.8 | 36.3 | 2.6 | 52 | 57.3 | 8.4 |
| | | 2 | 35 | 32.4 | 38.6 | 28.6 | 33.7 | | | 67 | | |
| | | 3 | 38.6 | 31.7 | 38.1 | 37.7 | 36.5 | | | 53 | | |
| reference example 3 | rice flour (Hinokuni Foods) | 1 | 51.4 | 51.5 | 49.8 | 53.4 | 51.5 | 52.1 | 0.8 | 38.6 | 38.2 | 0.4 |
| | | 2 | 54.1 | 55.6 | 49.6 | 48.2 | 51.9 | | | 38 | | |
| | | 3 | 53.4 | 57.3 | 51.5 | 49.9 | 53.0 | | | 37.9 | | |

Fig. 10

Analysis of fluidity

| No. | sample name | repose angle [°] (A) | flow-start angle [°] (B) | repose angle − flow start | residual material [g] |
|---|---|---|---|---|---|
| 1 | SFD 10%-Mannitol/10%-sucrose | 40.5 | 36.5 | 4.0 | 0.2 |
| 2 | SFD 8%-D-Mannitol/2%-sucrose | 38.7 | 27.3 | 11.4 | 0.2 |
| 3 | SFD 5%-D-Mannitol/5%-trehalose | 40.2 | 38.0 | 2.2 | 0.3 |
| 4 | SFD 5%-erythritol/5%-sucrose | 35.7 | 34.3 | 1.4 | 0.3 |
| reference example 1 | Tablettose (MEGGLE) | 31.2 | 29.6 | 1.6 | 0.3 |
| 5 | SFD 5%-D-Mannitol/5%-sucrose | 37.2 | 37.0 | 0.2 | 0.4 |
| reference example 2 | potato starch (Sun Smile) | 48.0 | 31.1 | 16.9 | 0.5 |
| 6 | SFD 10%-trehalose | 49.4 | 31.3 | 18.0 | 1.6 |
| 7 | SFD 10%-sucrose | 49.9 | 41.0 | 8.9 | 1.6 |
| 8 | SFD 10%-D-Mannitol | 47.7 | 40.3 | 7.4 | 1.6 |
| reference example 3 | rice flour (Hinokuni Foods) | 52.1 | 38.2 | 13.9 | 2.7 |
| 9 | SFD 10%-erythritol | 31.9 | 46.7 | -14.8 | 3.2 |
| 10 | FD 5%-D-Mannitol/5%-trehalose | 46.5 | 55.0 | -8.5 | 3.5 |
| 11 | FD 5%-D-Mannitol/5%-sucrose | 36.9 | 54.6 | -17.7 | 3.6 |
| 12 | FD 10%-erythritol | 30.5 | 46.7 | -16.2 | 3.7 |
| 13 | FD 5%-erythritol/5%-sucrose | 35.7 | 54.0 | -18.3 | 3.7 |
| 14 | FD 10%-trehalose | 59.4 | 58.0 | 1.4 | 5.4 |
| 15 | FD 10%-D-Mannitol | 39.7 | 52.3 | -12.6 | 5.7 |
| 16 | FD 10%-sucrose | 50.6 | 63.7 | -13.1 | 5.7 |
| 17 | FD 8%-D-Mannitol/2%-sucrose | 36.3 | 57.3 | -21.0 | 7.1 |

FD means shelf-type freeze-drying. SFD means spray freeze-drying.

FREEZE-DRIED PRODUCT

TECHNICAL FIELD

The present invention relates to a freeze-dried product related to a vacuum freeze-drying apparatus and a vacuum freeze-drying method.

BACKGROUND ART

Conventionally, a freeze-drying apparatus and a freeze-drying method for discharging a liquid from a nozzle, freezing/solidifying the liquid to form frozen particles and freeze-drying the frozen particles are proposed (Patent document 1).

In addition, a freeze-drying apparatus of placing a tray containing a raw material solution in a shelf and freeze-drying the raw material solution is proposed (Patent document 2).

In addition, a vacuum freeze-drying apparatus of discharging a liquid into a vacuum and sublimating/drying frozen particles is proposed (Patent document 3).

PRIOR ART DOCUMENTS

Patent Documents

[Patent document 1] International Patent Publication No. WO2013/050162

[Patent document 2] International Patent Publication No. WO2010/005021

[Patent document 3] International Patent Publication No. WO2019/235036

DISCLOSURE OF THE INVENTION

Problems to be Solved by the Invention

However, in the above described conventional technologies, the freeze-dried product cannot be continuously produced in the shelf-type vacuum freeze-drying apparatus (Patent document 2), for example. Namely, since a method of placing a tray containing a predetermined amount of raw material solution on a tray and taking out the tray after freeze-drying the raw material solution is used (so-called batch type), the manufacture is quantitatively restricted. Furthermore, since the freeze-dried product is joined together in the tray, the process of crushing and sieving the freeze-dried product is required after the freeze-drying so as to be easily transported as a powder. In addition, there is a problem that variations in quality may be produced since the progress state of the freeze-drying differs depending on the type of the shelf of the tray and the position of placing the tray in the shelf.

Namely, in the conventional technology, there are problems of productivity and variations in quality and time and labor are required for crushing and sieving the freeze-dried product after the freeze-drying. Namely, there is a problem of productivity since the processes from the preparation to the taking out cannot be performed in a series of continuous operations. In case where vials containing a predetermined amount of raw material solution are arranged on the shelf in the shelf-type freeze-drying apparatus, although the process after the freeze-drying is simplified by using the vials, variations in quality of freezing and drying are produced in the shelf-type freeze-drying apparatus due to the difference of the position placing the vials, for example. Namely, the temperature of the frozen substance during the freezing and the moisture content after the drying are not even in the freeze-drying. Therefore, it is impossible to quickly and heavily manufacture the freeze-dried product having a uniform freezing and drying quality.

The inventors of the present invention considered the above described problems and proposed a freeze-drying apparatus and a freeze-drying method capable of continuously manufacturing the freeze-dried product having a uniform freezing and drying quality (shown in Patent document 4: Japanese Patent No. 6777350). Here, “continuously” means that the processes of the feeding, the drying and the taking out are continued in the freeze-drying, different from the batch type where the tray or the vial containing a predetermined amount of raw material solution is placed to freeze-drying the raw material solution. The above described processes are continuously performed to continue manufacturing the freeze-dried product as long as the raw material solution is supplied.

The above described patent can overcome the problems of the conventional technology and the freeze-dried product can be continuously manufactured as long as the raw material solution is supplied. Thus, the manufacture is not quantitatively restricted and variations in quality can be improved. However, there is a problem that the frozen substance and the freeze-dried product are adhered to the drying unit when the frozen substance and the freeze-dried product are transferred in a drying unit of the freeze-drying apparatus. Namely, the adhered frozen substance and freeze-dried product function as a buffer material in the drying unit. Thus, the heat cannot be evenly transferred to the frozen substance and the freeze-dried product transferred after that.

In order to solve the above described problem, it is required that the frozen substance and the freeze-dried product are transferred smoothly while sufficiently contacting with the drying unit to transfer the heat well for preventing the frozen substance and the freeze-dried product from being adhered to the drying unit. Here, it should be noted that the dried product manufactured by the freeze-drying has the property of being easily adhered to each other and easily adhered to an inner wall surface of the drying unit. Accordingly, the purpose of the present invention is to manufacture the freeze-dried product having a property of smoothly moving in the drying unit for continuously manufacturing the freeze-dried product having even quality in the above described freeze-drying apparatus.

Means for Solving the Problem

In order to solve the above described problem, the present invention found that the property of the freeze-dried product is important for preventing the freeze-dried product from being adhered to the wall surface of the drying unit and smoothly transferring the freeze-dried product while preventing the freeze-dried product from adhering and joining to each other and found the property of the freeze-dried product by measuring a repose angle and a flow-start angle.

Namely, the freeze-dried product of the present invention is a freeze-dried product manufactured by being dried while moving in a state of receiving a mechanical force in a freeze-drying apparatus, wherein the freeze-drying apparatus includes: a freezing unit for producing a frozen substance by spraying a raw material solution; and a drying unit for drying the frozen substance while transferring the frozen substance, the freezing unit is configured to produce the frozen substance by discharging the raw material solution from a nozzle into a vacuum or into a cold air blowing environment, the drying unit has a tubular shape linearly extending in a horizontal direction, the drying unit includes a tubular member kept in a vacuum state, a spiral wall or groove portion is formed on an inner wall of the tubular member continuously in a longitudinal direction of the tubular member, the drying unit is divided into three or more sections in the longitudinal direction to surround a periphery of the tubular member, a temperature-controlled air or liquid is configured to be supplied to each of the three or more sections of the periphery of the tubular member to transfer a heat to the inner wall of the tubular member and the spiral wall or groove portion, the tubular member is configured to be rotated to transfer the frozen substance or the freeze-dried product in the longitudinal direction of the tubular member while sliding on the spiral wall or groove portion, sublimate or dry the frozen substance or the freeze-dried product while transmitting the heat to the frozen substance or the freeze-dried product from the inner wall of the tubular member and the spiral wall or groove portion, and discharge a moisture evaporated when the frozen substance or the freeze-dried product is sublimated or dried to an outside, a flow-start angle is less than 44 degrees or a repose angle is less than 55 degrees and larger than the flow-start angle, and a residual amount is 3 g or less with respect to 10 g of the raw material solution fed into freeze-drying apparatus when a length of the tubular member is 30 cm in the longitudinal direction.

In the freeze-drying apparatus of the present invention, the drying unit includes the tubular member for transferring the frozen substance or the freeze-dried product inside the drying unit, the tubular member has a tubular shape linearly extending in a horizontal direction, and a transfer means provided with a continuously formed spiral wall or groove portion is provided inside the tubular member. A periphery of the tubular member is surrounded so as to be divided into three or more sections in the longitudinal direction, a temperature-controlled air or liquid is configured to be supplied to each of the three or more sections of the periphery of the tubular member to adjust the temperature of the outer surface of the tubular member. Because of this, the frozen substance or the freeze-dried product is sufficiently contacted with the inner wall of the tubular member or the transfer means inside the tubular member, and the frozen substance or the freeze-dried product is transferred in the longitudinal direction of the tubular member while sliding on the transfer means. At the same time, the frozen substance or the freeze-dried product inside the tubular member is sublimated or dried by efficiently transferring the heat. Note that the evaporated moisture is discharged to an outside. The tubular member is rotated by a rotating unit. When the tubular member is rotated, the frozen substance entered from the inlet is sequentially transferred through the transfer means provided with the spiral wall or groove portion and transferred toward the outlet in the tubular member. When the frozen substance is transferred as described above, the frozen substance is continuously sublimated or dried. It is revealed that the freeze-dried product can be transferred more smoothly while preventing the freeze-dried product from adhering to the other object (e.g., wall surface) of the drying unit and adhering to each other by using the freeze-dried product having the above described property.

Furthermore, the freeze-dried product of the present invention is a freeze-dried product manufactured by being dried while moving in a state of receiving a mechanical force in a freeze-drying apparatus, wherein the flow-start angle is 38 degrees or less, the repose angle is 40.5 degrees or less and larger than the flow-start angle, and the residual amount is 0.4 g or less. It is revealed that the freeze-dried product can be transferred further more smoothly while further preventing the freeze-dried product from adhering to the other object (e.g., wall surface) of the drying unit and adhering to each other by using the freeze-dried product having the above described property.

Furthermore, in the freeze-dried product of the present invention, the raw material solution includes at least one of a sugar alcohol and a disaccharide as an excipient, and the sugar alcohol is an erythritol or a mannitol, and the disaccharide is a sucrose or a trehalose. Since at least one of the sugar alcohol (e.g., mannitol or erythritol) and the disaccharide (e.g., sucrose or trehalose) is included as the excipient of the raw material solution, a contact area between each of the powder of the freeze-dried product is reduced to suppress the adhesion. Thus, the freeze-dried product can be smoothly transferred and dried in the drying unit while sliding smoothly.

Furthermore, in the freeze-dried product of the present invention, the freeze-dried product is an injectable substance or a drug in a solid formulation, and the injectable substance or the drug is selected from the group consisting of: a vaccine preparation including a COVID-19 vaccine preparation, a smallpox vaccine preparation or an influenza vaccine preparation; a bio-pharmaceutical including a nucleic acid or an antibody; an antiviral agent; and a stem cell.

Effects of the Invention

In the present invention, when the above described conditions are adopted, the freeze-dried product can be smoothly transferred while being dried in a state that the freeze-dried product is sufficiently contacted with the drying unit to transfer the heat sufficiently. In addition, the freeze-dried product is prevented from being adhered to the wall surface of the tubular member and prevented from being adhered and joined to each other. Thus, the freeze-dried product can be smoothly transferred while sliding in the tubular member smoothly and dried while transferring the heat sufficiently.

BRIEF DESCRIPTION OF THE DRAWINGS

FIG. 8 is a measurement data of the repose angle and the flow-start angle of the experiment samples No. 1 to 8 and reference examples 1 to 2 of the freeze-dried product.

FIG. 9 is a measurement data of the repose angle and the flow-start angle of the experiment samples No. 9 to 17 and reference example 3 of the freeze-dried product.

FIG. 10 is a data of analyzing fluidity based on the measurement data of the repose angle and the flow-start angle.

MODES FOR CARRYING OUT THE INVENTION

The preferable embodiments of the present invention will be described below in detail based on the drawings. Refer to the above described Patent document 4 (Japanese Patent No. 6777350) about the vacuum freeze-drying apparatus used for manufacturing the freeze-dried product of the present invention. Note that the freeze-dried product includes an injectable substance or a drug in a solid formulation. For example, the freeze-dried product is: a vaccine preparation including a smallpox vaccine preparation or an influenza vaccine preparation; a bio-pharmaceutical including a nucleic acid or an antibody; an antiviral agent; and a stem cell.

Figure 1:
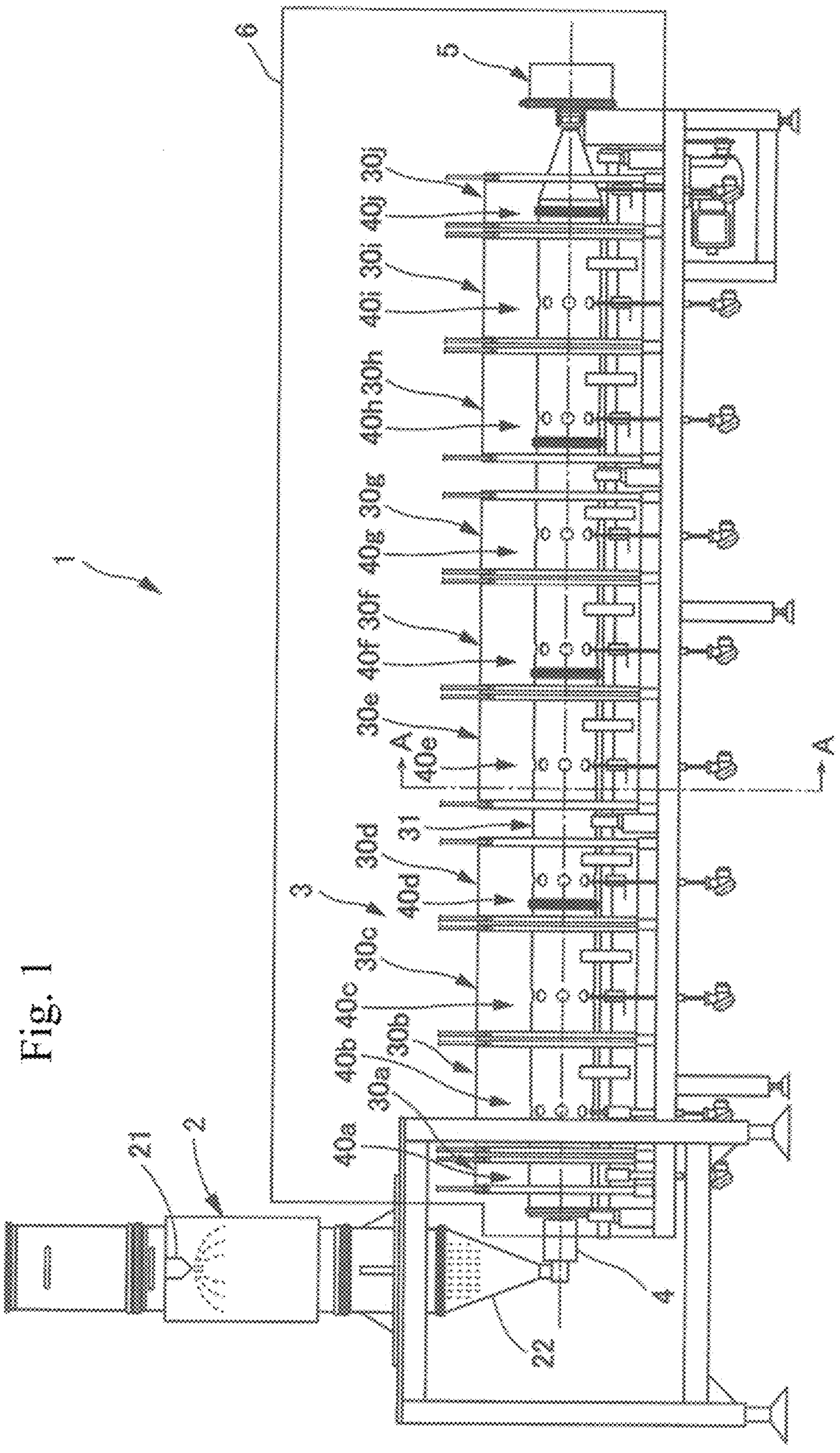
FIG. 1 is a front longitudinal section view of a vacuum freeze-drying apparatus used for performing the present invention.
Figure 2:
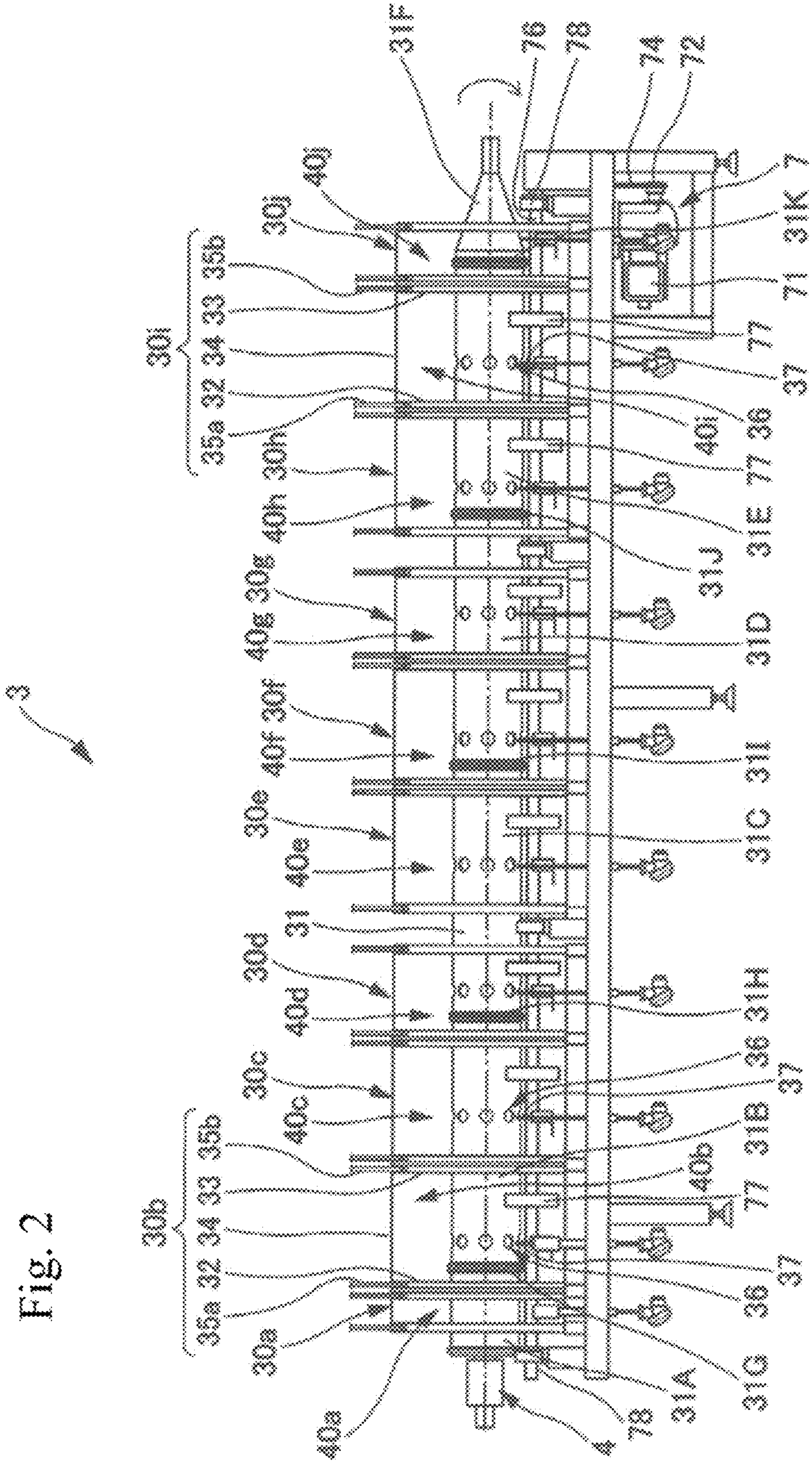
FIG. 2 is a front view showing a drying unit of the vacuum freeze-drying apparatus of FIG. 1.
Figure 3:
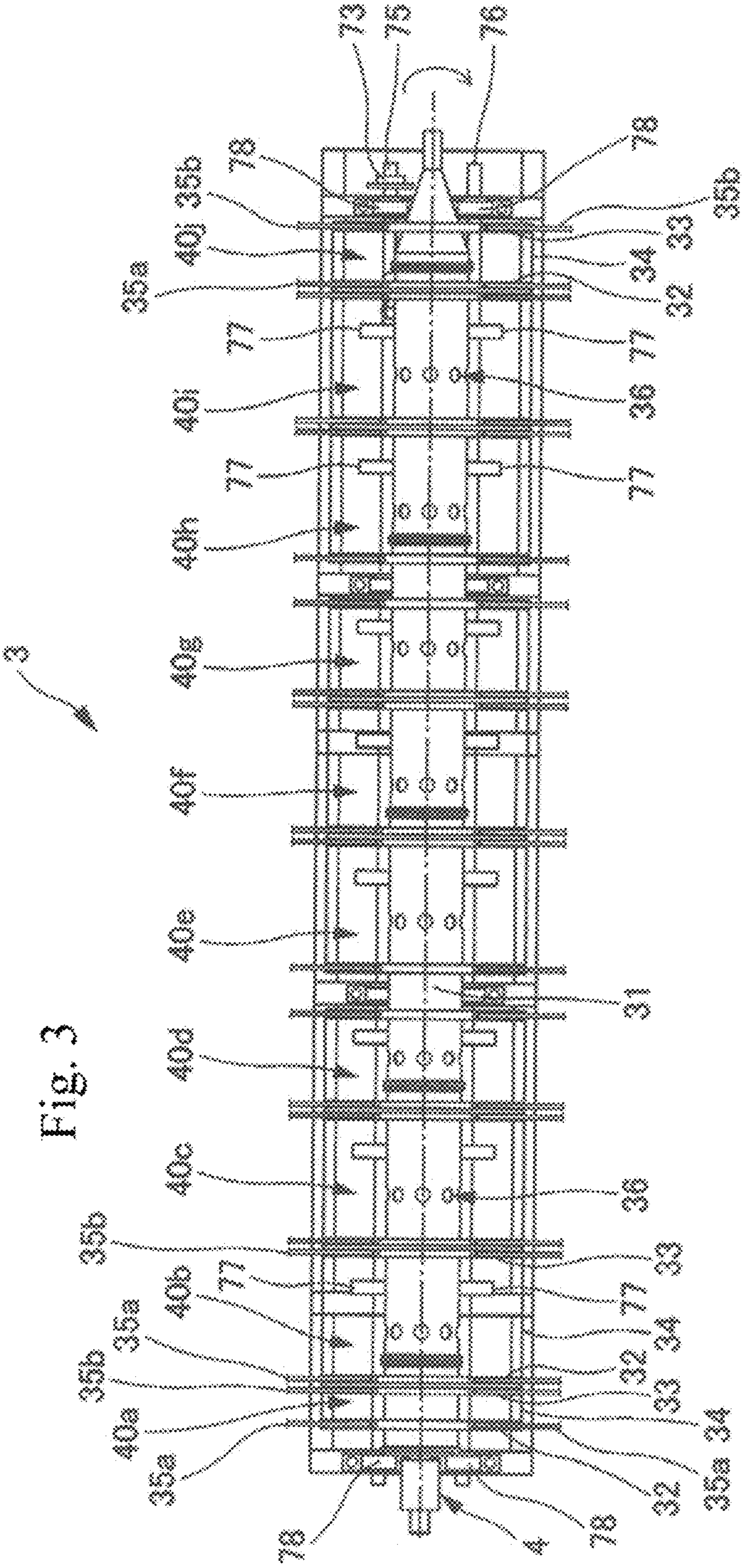
FIG. 3 is a plan view showing the drying unit of the vacuum freeze-drying apparatus of FIG. 1.

FIG. 1 is a front longitudinal section view of the vacuum freeze-drying apparatus used for performing the present invention. FIG. 2 is a front view showing the drying unit of the vacuum freeze-drying apparatus of FIG. 1. FIG. 3 is a plan view showing the drying unit of the vacuum freeze-drying apparatus of FIG. 1.

A vacuum freeze-drying apparatus 1 includes a freezing unit 2, a drying unit 3, a connecting unit 4 and a collecting unit 5. The freezing unit 2 discharges the raw material solution from a nozzle 21 into a vacuum vessel. The discharged raw material solution is frozen in the vacuum and the frozen substance is produced. The raw material solution is self-frozen in the middle of being discharged or dripped when the moisture is evaporated and latent heat is taken. Thus, the frozen substance, which is fine frozen particles, is generated by sublimation. Then, the frozen substance is dropped toward a collection unit 22 and collected by the collection unit 22 which has a tapered shape tapered downward. The connecting unit 4 is a unit for connecting the freezing unit 2 with the drying unit 3 and transferring the frozen substance produced in the freezing unit 2 to the drying unit 3. The drying unit 3 sublimates and dries the frozen substance.

The collecting unit 5 is a unit for collecting the dried object discharged from the outlet of the drying unit 3. In the vacuum freeze-drying apparatus, it is also possible to produce the frozen substance by discharging the raw material solution from the nozzle into a cold air blowing environment. When using the above described cold air freezing method, the cold air is blown from a lateral side when the raw material is dropped.

The drying unit 3 includes a tubular member 31 for transferring the frozen substance or the freeze-dried product. The tubular member 31 has a tubular shape linearly extending in a horizontal direction. The both ends of the tubular member 31 are opened. The tubular member 31 includes an inlet 31*b* from which the frozen substance transferred by the connecting unit 4 is entered and an outlet 31*c* which functions as the outlet of the dried object after it is sublimated and dried. The inlet 31*b* includes a reception port 302 for receiving the frozen substance. In the tubular member 31, a spiral transfer means 31*a* is provided near the inner wall of the tubular member 31 so that the spiral transfer means 31*a* is continuously formed from the inlet 31*b* toward the outlet 31*c*. The frozen substance transmitted from the connecting unit 4 is entered from the inlet 31*b* of the tubular member 31 and transferred to the outlet 31*c* by the spiral transfer means 31*a*.

The tubular member 31 is divided into three or more sections (at least three sections) in the longitudinal direction to surround a periphery of the tubular member 31. Temperature controllers 30*a* to 30*j* are provided for controlling the temperature of each of the three or more sections of the periphery of the tubular member 31 by dripping and supplying temperature-controlled air or liquid. The temperature controllers 30*a* to 30*j* are provided on the outer peripheral portions of the tubular member 31 to adjust the temperature of the outer surface of a plurality of areas 40*a* to 40*j* of the tubular member 31. The plurality of areas 40*a* to 40*j* are provided from the inlet 31*b* to the outlet 31*c* of the tubular member 31 so that the temperature can be independently controlled for each of the areas 40*a* to 40*j*. The temperature controllers 30*a* to 30*j* control the temperature of each portion of the tubular member 31 corresponding to the plurality of areas 40*a* to 40*j* by adjusting the temperature of the plurality of areas 40*a* to 40*j*. The number of the temperature controllers 30*a* to 30*j* is ten and the number of the plurality of areas formed by ten temperature controllers 30*a* to 30*j* is also ten.

The heat is transferred from the temperature-controlled areas 40*a* to 40*j* to the inner wall of the tubular member 31 and a transfer means 31*a* provided inside the tubular member 31. The frozen substance or the freeze-dried product is sufficiently contacted with the inner wall or the transfer means 31*a*. Thus, the frozen substance or the freeze-dried product is transferred in the longitudinal direction of the tubular member 31 and the heat is transferred efficiently by the sliding movement between the frozen substance or the freeze-dried product and the transfer means 31*a*. Consequently, the frozen substance or the freeze-dried product inside the tubular member 31 is sublimated or dried and the evaporated moisture is discharged to the outside of the tubular member 31. The area of the periphery of the tubular member divided into three or more sections includes at least a minus temperature area, a temperature area 40° C. higher than the minus temperature area, and a temperature area of plus 20° C. or more from the inlet to the outlet of the tubular member 31.

A rotating unit 7 for rotating the tubular member 31 is provided. When the tubular member 31 is rotated by the rotating unit 7, the frozen substance entered from the inlet 31*b* of the tubular member 31 is sequentially transmitted toward the outlet 31*c* in the tubular member 31 through the spiral transfer means 31*a*. In the above describe process, the frozen substance is continuously sublimated and dried. The rotating unit 7 is configured to rotate only the tubular member 31. Thus, the temperature controllers 30*a* to 30*j* located at the outer periphery of the tubular member 31 are not rotated. The temperature controllers 30*a* to 30*j* are fixed so as not to be rotated.

The rotating unit 7 includes a motor 71, pulleys 72, 73, a belt 74, rotation axes 75, 76 and rotary rollers 77, 78. The belt 74 is wound around the pulleys 72, 73. The rotational force of the motor 71 is transmitted via the belt 74. The rotary roller 77 are arranged below the both ends of the tubular member 31. The tubular member 31 is placed on the rotary rollers 77 which are arranged on both sides. The pulley 73 is attached to near one end of the rotation axis 75. The rotary roller 78 attached to a fixing stand is provided inside the pulley 73 and the rotary roller 78 attached to a fixing stand is also provided on the other end of the rotation axis 75. Eight rotary rollers 77 are attached to the rotation axis 75 between the rotary rollers 78, 78. The rotary rollers 78 attached to a fixing stand are provided on one end of the rotation axis 76 and the rotary rollers 78 attached to a fixing stand are also provided on the other end of the rotation axis 76. Eight rotary rollers 77 are attached to the rotation axis 76 between the rotary rollers 78, 78. The rotary rollers 77 attached to the rotation axis 75 are driving rollers while the rotary rollers 77 attached to the rotation axis 76 are driven rollers.

When the motor 71 is rotated, the belt 74 is rotated via the pulley 72 and the rotation axis 75 is rotated by the rotation of the pulley 73. The tubular member 31 is rotated when the rotary rollers 77 fixed to the rotation axis 75 are rotated, and the rotary rollers 77 are rotated as the driven rollers attached to the rotation axis 76. As for the rotating speed of the tubular member 31, the rotation speed rotated by the rotating unit 7 is preferably more than 1/30 rotation per minute or more and one rotation per minute or less.

Figure 4A:
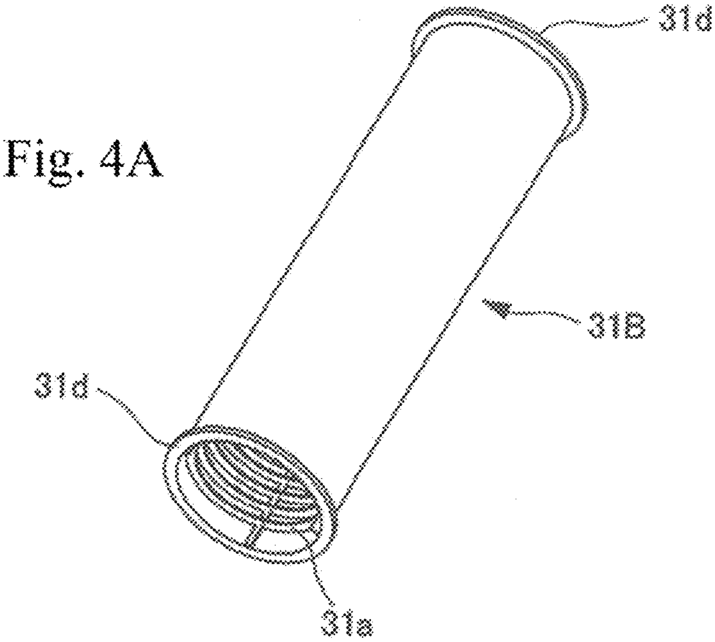
FIG. 4A is a perspective view.
Figure 4C:
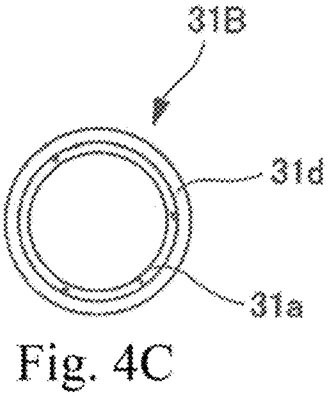
FIG. 4C is a cross-sectional view.
Figure 4B:
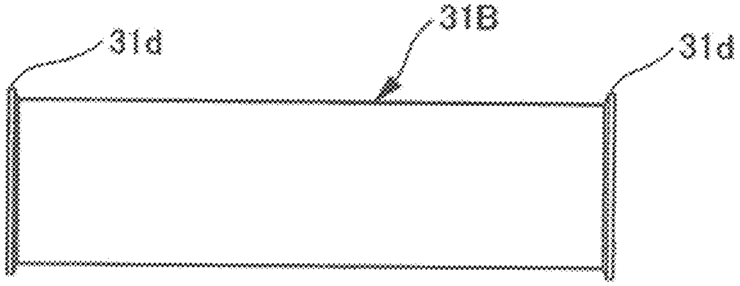
FIG. 4B is a front view.
Figure 4D:
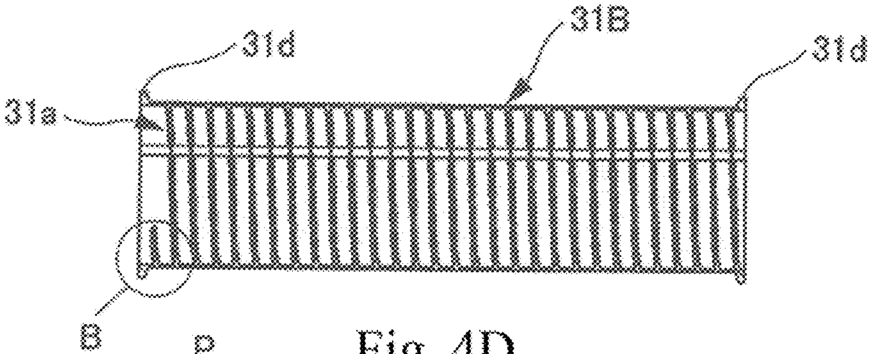
FIG. 4D is a front longitudinal section view and FIG. 4E is a partially enlarged view showing one of a plurality of tubular portions constituting the tubular member provided with the drying unit.
Figure 4E:
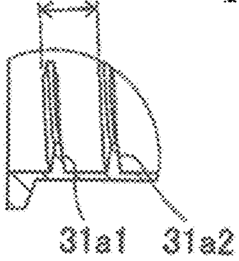

Then, the transfer means 31*a* used for performing the present invention in the drying unit will be explained. FIGS. 4A to 4E show a tubular portion 31B which is one of a plurality of tubular portions constituting the tubular member 31. FIG. 4A is a perspective view of the tubular portion 31B, FIG. 4B is a front view of the tubular portion 31B, FIG. 4C is a side view of the tubular portion 31B, FIG. 4D is a front longitudinal section view of the tubular portion 31B and FIG. 4E is a partially enlarged cross-sectional view where B-portion shown in FIG. 4D is enlarged.

Edge portions 31*d* are formed on the tubular portion 31B to protrude from both opening ends in a radial direction. Apart of the spiral transfer means 31*a* is continuously formed from one end of the tubular portion 31B to the other end. The wall portions are continuously formed on an inner wall of the tubular portion 31B as a part of the transfer means 31*a* (e.g., a wall portion 31*al* of the first round, a wall portion 31*a*2 of the second round). The height of wall portion 31*al* and the height of the wall portion 31*a*2 are the height of the transfer means 31*a*. For example, the height of the transfer means 31*a* is preferably within the range of 3 mm or more and 50 mm or less. A pitch P between the wall portion 31*al* and the wall portion 31*a*2 is the pitch of the spiral transfer means 31*a*. For example, the pitch of the spiral transfer means 31*a* is preferably within the range of 5 mm or more and 20 mm or less. It is possible to form spiral groove portions on an inner peripheral surface of the tubular member 31 as the transfer means 31*a* having a rotating axis as a center. Thus, the function of spirally feeding the material in the tubular member 31 is given. Accordingly, the frozen substance or the freeze-dried product can be transferred.

It is required to find the property capable of smoothly transferring the dried product in the drying unit 3 and extracting the produced dried product from the drying unit 3. Thus, the relation between the residual material of the dried product in the apparatus and the property was revealed. Namely, the property is related to the transfer of the freeze-dried product. Specifically, the property is the repose angle and the flow-start angle where the transfer starts. When the measurement was performed focusing on the flow-start angle and the repose angle, it was revealed that the repose angle should be larger than the flow-start angle and the repose angle should be less than 55 degrees as the property of the freeze-dried product capable of being smoothly transferred in the tubular member 31. In addition, it was revealed that the flow-start angle should be less than 44 degrees as the property of the freeze-dried product capable of being smoothly transferred in the tubular member 31.

EXAMPLES

Hereafter, the preferable examples of the present invention will be explained.

First, the preparation method of the samples will be described. Here, the raw material solution is a raw material reagent. A drug and a medical agent are not contained in the raw material solution for convenience purposes. As an example of the method of preparing the raw material solution containing 10%-D-Mannitol, water is added to 50 g of D-Mannitol until the total weight becomes 500 g and the mixture is stirred. As an example of the method of preparing a mixed solution containing 5%-D-Mannitol/5%-sucrose, 25 g of sucrose is added to 25 g D-Mannitol, then water is added until the total weight becomes 500 g and the mixture is stirred. Hereafter, when the similar description is used, this means the weight % of the excipient with respect to the raw material solution.

(1) 10%-D-Mannitol/10%-sucrose, (2) 8%-D-Mannitol/2%-sucrose, (3) 5%-D-Mannitol/5%-trehalose, (4) 5%-erythritol/5%-sucrose, (5) 5%-D-Mannitol/5%-sucrose, (6) 10%-trehalose, (7) 10%-sucrose, (8) 10%-D-Mannitol, (9) 10%-erythritol, (10) 5%-D-Mannitol/5%-trehalose, (11) 5%-D-Mannitol/5%-sucrose, (12) 10%-erythritol, (13) 5%-erythritol/5%-sucrose, (14) 10%-trehalose, (15) 10%-D-Mannitol, (16) 10%-sucrose and (17) 8%-D-Mannitol/2%-sucrose were prepared as the raw material solution which were the bases of the samples used for the experiment of the present invention.

In the raw material solution prepared as described above, the freeze-dried product was produced by the freeze-drying apparatus 1 (spray freeze-drying apparatus) about the raw material solution (1)-(8) and named as the samples No. 1, No. 2, No. 3, No. 4, No. 5, No. 6, No. 7 and No. 8 respectively. In addition, the freeze-dried product was produced by the shelf-type freeze-drying apparatus about the raw material solution (9)-(17), crushed by a stainless spatula, and sieved with a mesh having an aperture of 850 m and named as the samples No. 9, No. 10, No. 11, No. 12, No. 13, No. 14, No. 15, No. 16 and No. 17.

The moisture content of the freeze-dried product of the target of the present invention is less than 10%. In addition, the particle diameter of the freeze-dried product produced by the vacuum freeze-drying apparatus 1 is 2000 m or less.

As the reference examples, (1) tablettose, (2) potato starch and (3) rice flour were prepared while being sieved with a mesh having an aperture of 850 μm although they were not the freeze-dried product.

Then, the method of the characteristic test will be described.

Figure 5:
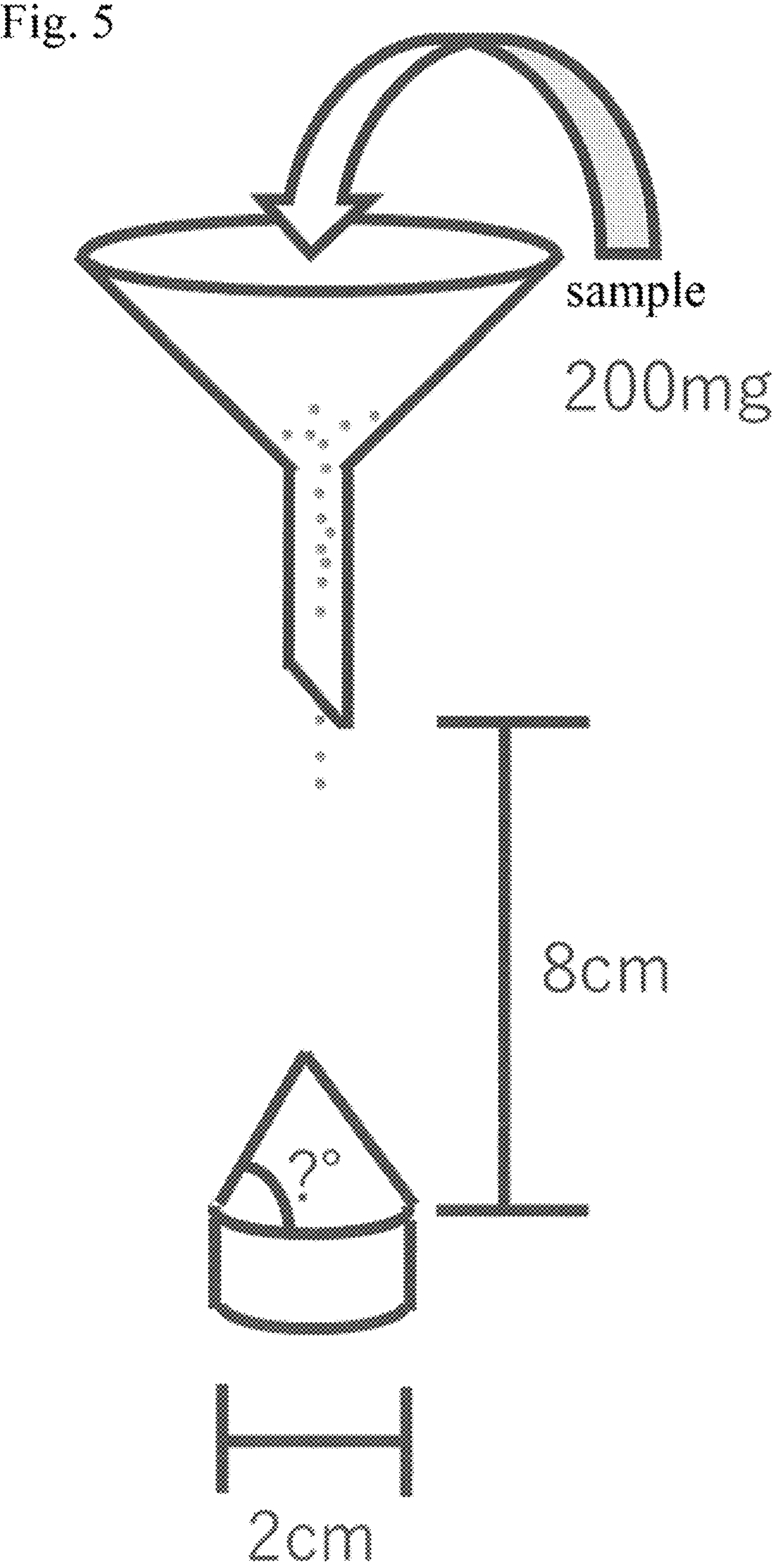
FIG. 5 is an explanation drawing of a measuring method of a repose angle of the present invention.

FIG. 5 is an explanation drawing of the measuring method of the repose angle. The repose angle was measured as described below.

200 mg of the dried product finally prepared was collected, entered into a funnel having an inner diameter of a funnel mouth of 6 mm and discharged on a stand having a diameter of 2 cm located 8 cm downward from the funnel mouth by free fall. Thus, the dried product was deposited. At this time, it is not necessary that the deposited state has a simple conical shape. An apex may be located at the other portion than the center. Therefore, when the repose angle is measured, it is necessary to calculate the average value of the inclined angles from the apex to the conical face located below. Namely, the average of the angles was calculated at four positons of the crossed directions passing through the apex to the horizontal surfaces. The later described No. 1 to No. 4 (left column) of the sample No. 1 show the result of four experiments and show the measured values of the repose angle at four positions and the average of them. The same is also applied to the sample No. 2 and later samples. The result of the flow-start angle is also shown in the right column. Regarding the sample No. 1, the flow-start angle was measured for each of four experiments and the average of the flow-start angle was calculated. In addition, the standard deviate of the flow-start angle is shown in the right column. The same is also applied to the following sample No. 2 to the sample No. 20 (shown in FIG. 6).

Figure 6:
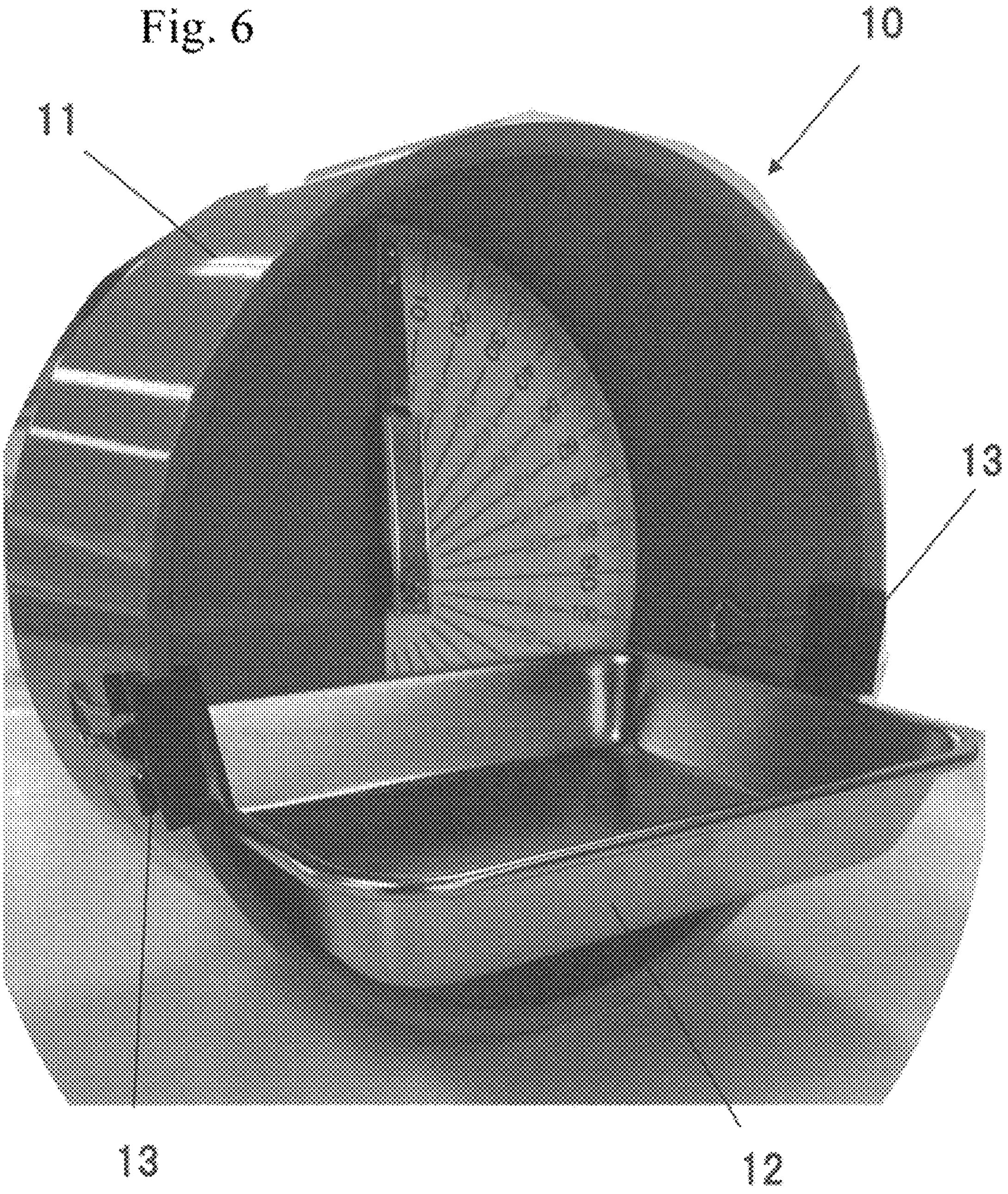
FIG. 6 is a perspective view of a measuring apparatus a flow-start angle of the present invention.
Figure 7:
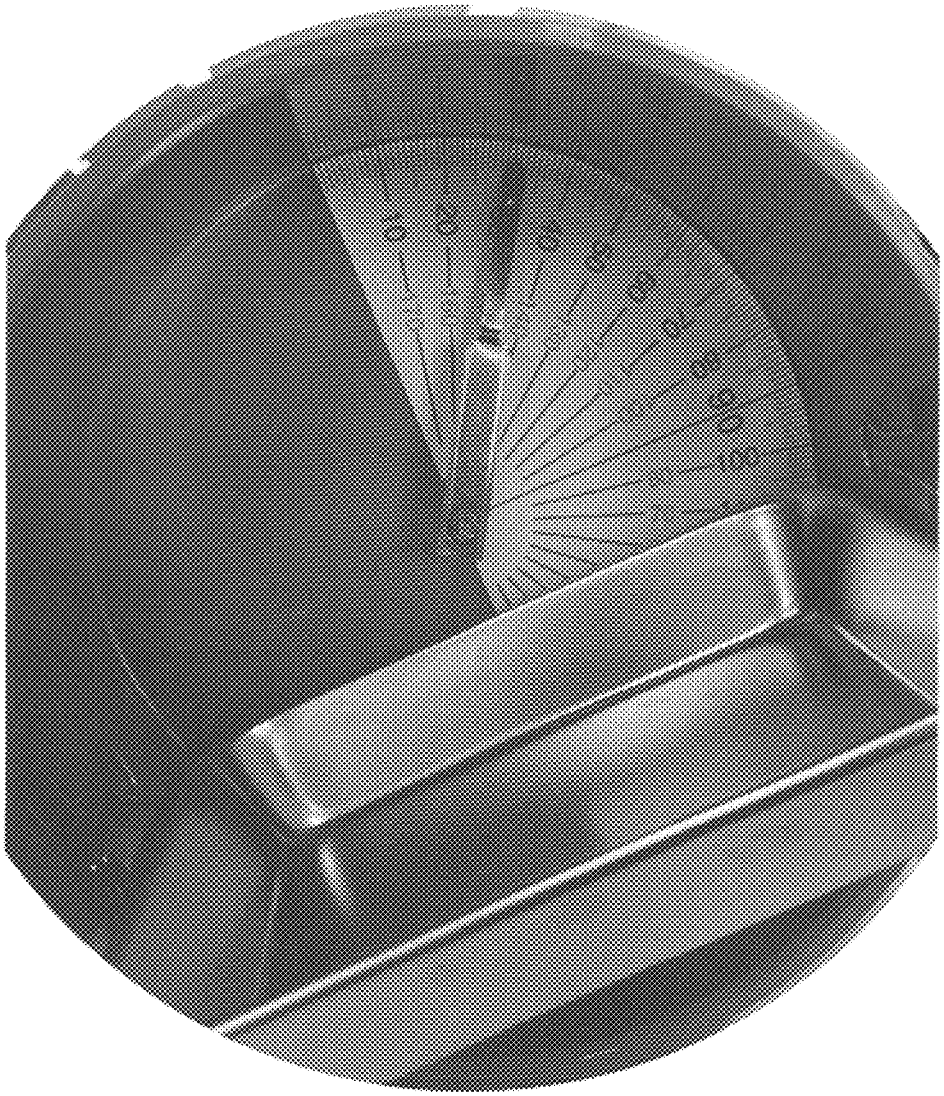
FIG. 7 is a front view showing a measuring state of the flow-start angle.

FIG. 6 is a perspective view of the measuring apparatus for measuring the flow-start angle of the present invention. FIG. 7 is a front view of the measuring apparatus showing the measuring state of the flow-start angle. The flow-start angle is measured for analyzing the adhesive property of the freeze-dried product to the apparatus and the adhesive property between the freeze-dried products. Here, the freeze-dried product is placed on the tray and the tray is inclined slowly. Thus, the angle is measured when the freeze-dried product starts to flow. A measuring apparatus 10 used in the experiment was formed by installing a flat-bottomed tray 12 in a horizontal state inside a cylinder 11 which was made of resin and the axial center direction of the cylinder 11 was horizontally arranged, adding scales of 180 degrees (a half circle) to one end in the axial direction of the cylinder 11, and attaching a measurement needle rotatably so that the measurement position is always kept upward in the vertical direction at the center of the scales. The measuring apparatus 10 was fixed to the cylinder 11 by a fastener 13 at both ends of the tray 12. The tray 12 was made of SUS430 and a width was 14 cm, a depth was 9 cm and a height was 15 mm. The tray 12 was filled with 200 mg of the freeze-dried product and the tray was tapped ten times by hand to flatten the accumulated freeze-dried product while preventing the freeze-dried product from scattering. Then, the cylinder 11 is inclined (rotated) at the rotating speed of approximately 6 degrees per second. Consequently, the position of the measurement needle on the scales was read when the freeze-dried product started to flow on the tray. Thus, the flow-start angle was determined. FIG. 7 shows the case where the flow-state angle is approximately 31.1 degrees.

In addition, the residual characteristics of the dried product in the tubular member 31 were measured for evaluating the actual usefulness in the apparatus. As the experiment method, the tubular portion was detached except for the tubular portion 31B having the length of 30 cm in the longitudinal direction of the tubular member 31 shown in FIG. 4, 10 g of the sample was entered into a portion separated 2 cm from the inlet in a state that the tubular portion 31B was rotated around the axial direction for thirty minutes at a rotating speed of one rotation per minute, and the material discharged from the outlet of the tubular portion 31B was collected. Then, the residual amount (calculated by subtracting the discharged amount from the fed amount) was measured.

In FIG. 8 and FIG. 9, the repose angle and the flow-start angle were measured three times or four times and the average and the standard deviate were calculated. As an example, regarding SFD10%-Mannitol/10%-sucrose of No. 1, the repose angle is 36.5 degrees in No. 1, 42.8 degrees in No. 2, 42.2 degrees in No. 3 and 40.5 degrees in No. 4. Thus, the average of the repose angle of 1 to 4 was 40.5. In addition, the flow-start angle is 39 degrees in No. 1, 31 degrees in No. 2, 44 degrees in No. 3 and 32 degrees in No. 4. Thus, the average of the flow-start angle was 36.5.

The experiment raw data of the sample No. 1 to the sample No. 20 are shown in FIG. 8 and FIG. 9 and the analysis result and the evaluation result are shown in FIG. 10. "FD" means the shelf-type freeze-drying and "SFD" means the spray freeze-drying in the sample name shown in FIG. 8, FIG. 9 and FIG. 10. FIG. 10 shows the average A (°) of the repose angle, the average B (°) of the flow-start angle, the repose angle-flow-start angle C (°) and the residual material D (g) of the sample No. 1 to the sample No. 17 and the reference examples 1-3.

In the present invention, the dried product having the transfer characteristics of generating the residual material of 3 g or less when the spiral transfer means 31*a* (corresponding to the longitudinal length of the tubular member 31) is 30 cm and the fed material is 10 g is used as the example. When the physical property of the freeze-dried product used as the example was analyzed, it was revealed that the following relation was satisfied: the repose angle A was 55 degrees or less and the repose angle is equal to or greater than the flow-start angle (the repose angle≥the flow-start angle). In addition, it was revealed that the flow-start angle was less than 44 degrees.

Namely, the relation between the repose angle and the flow-start angle is satisfied as described above, the suitable dried product can be transferred smoothly. For example, the dried product can be transferred smoothly when the repose angle of SFD10%-D-Mannitol/10% sucrose of the sample No. 1 is 40.5 degrees, the flow-start angle is 36.5 degrees, the repose angle-flow-start angle is 4.0 degrees and the residual material is 0.2 grams. In the examples shown in FIG. 10, the samples No. 1, 2, 3, 4, 5, 6, 7 and 8 are the object of the present invention, and the sample No. 14 is the comparative example since the condition of the repose angle≥55 degrees is not satisfied. The condition of the repose angle≥the flow-start angle is not satisfied in the samples No. 9 to 17 except for the sample No. 14. Accordingly, these are the comparative examples.

As a result, the sample No. 1 to the sample No. 8 are the examples of the present invention since the preferable result could be obtained. The sample No. 9 to No. 17 which are not suitable are comparative examples. In the above described examples, the residual material of the samples No. 1 to 6 was 0.4 g or less (especially small) and the transfer was good. In particular, the dried product could be transferred well when the freeze-dried product was generated by using a mixed solution of the sugar alcohol and the disaccharide was used as the raw material solution and D-Mannitol or erythritol was used as the sugar alcohol and the sucrose or the trehalose was used as the disaccharide.

When the residual amount is 3 g or less with respect to 10 g of the fed amount and 30 cm of the length of the tubular portion 31B in the transfer direction, the residual amount becomes 30 g to 60 g with respect to the tubular member 31 having the effective drying cylinder length of 3 m to 6 m, which corresponds to the length of ten tubular portions 31B. This means that the residual amount is approximately 100 g or less when the apparatus is operated for a long time. Thus, the residual amount is acceptable as a production apparatus. If the residual amount is 0.4 g or less in the same condition, the residual amount becomes 4 g to 8 g with respect to the effective drying cylinder length of 3 m to 6 m. Thus, it is more preferable from the viewpoint of the yield.

Although the present invention has been described using above embodiments, it goes without saying that the technical scope of the present invention is not limited to the scope of the above embodiments, and it is clear to those skilled persons in the art that various modifications or improvements added to the above embodiments are possible. Further, it is clear from the description of the scope of claims that the form to which such modifications or improvements are added may be included in the technical scope of the present invention.

DESCRIPTION OF THE REFERENCE NUMERALS

1: freeze-drying apparatus; 2: freezing unit; 3: drying unit; 4: connecting unit; 5: collecting unit; 7: rotating unit; 10: measuring apparatus of flow-start angle; 30*a* to 30*j*: temperature controller; 31: tubular member; 31*a*: spiral transfer means; 40*a* to 40*j*: area

The invention claimed is:

1. A freeze-dried product manufactured by being dried while moving in a state of receiving a mechanical force in a freeze-drying apparatus, wherein the freeze-drying apparatus includes: a freezing unit for producing a frozen substance by spraying a raw material solution; and a drying unit for drying the frozen substance while transferring the frozen substance, the freezing unit is configured to produce the frozen substance by discharging the raw material solution from a nozzle into a vacuum or into a cold air blowing environment, the drying unit has a tubular shape linearly extending in a horizontal direction, the drying unit includes a tubular member kept in a vacuum state, a spiral wall or groove portion is formed on an inner wall of the tubular member continuously in a longitudinal direction of the tubular member, the drying unit is divided into three or more sections in the longitudinal direction to surround a periphery of the tubular member, a temperature-controlled air or liquid is configured to be supplied to each of the three or more sections of the periphery of the tubular member to transfer a heat to the inner wall of the tubular member and the spiral wall or groove portion, the tubular member is configured to be rotated to transfer the frozen substance or the freeze-dried product in the longitudinal direction of the tubular member while sliding on the spiral wall or groove portion, sublimate or dry the frozen substance or the freeze-dried product while transmitting the heat to the frozen substance or the freeze-dried product from the inner wall of the tubular member and the spiral wall or groove portion, and discharge a moisture evaporated when the frozen substance or the freeze-dried product is sublimated or dried to an outside, a flow-start angle is less than 44 degrees or a repose angle is less than 55 degrees and larger than the flow-start angle, and a residual amount is 3 g or less with respect to 10 g of the raw material solution fed into freeze-drying apparatus when a length of the tubular member is 30 cm in the longitudinal direction.

2. The freeze-dried product according to claim 1, wherein the flow-start angle is 38 degrees or less, the repose angle is 40.5 degrees or less and larger than the flow-start angle, and the residual amount is 0.4 g or less.

3. The freeze-dried product according to claim 1, wherein the raw material solution includes at least one of a sugar alcohol and a disaccharide as an excipient.

4. The freeze-dried product according to claim 3, wherein the sugar alcohol is an erythritol or a mannitol, and the disaccharide is a sucrose or a trehalose.

5. The freeze-dried product according to claim 1, wherein the freeze-dried product is an injectable substance or a drug in a solid formulation.

6. The freeze-dried product according to claim 5, wherein the injectable substance or the drug is selected from the group consisting of: a vaccine preparation including a COVID-19 vaccine preparation, a smallpox vaccine preparation or an influenza vaccine preparation; a biopharmaceutical including a nucleic acid or an antibody; an antiviral agent; and a stem cell.

* * * * *